United States Patent [19]
Knudson

[11] Patent Number: 5,860,213
[45] Date of Patent: Jan. 19, 1999

[54] METHOD OF MAKING A FRAMING ASSEMBLY

[76] Inventor: Gary A. Knudson, 30401 Heavenly Ct., Evergreen, Colo. 80439

[21] Appl. No.: 898,631

[22] Filed: Jul. 22, 1997

Related U.S. Application Data

[62] Division of Ser. No. 508,260, Jul. 27, 1995, Pat. No. 5,660,012.

[51] Int. Cl.[6] .................................................. B23P 11/00
[52] U.S. Cl. ................................ 29/897.312; 29/525.1; 29/407.1; 29/464; 29/512; 52/745.19
[58] Field of Search ............................ 29/21.1, 512.521, 29/522.1, 524.1, 897.312, 407.09, 407.1, 464, 525.1, 428; 52/241, 656.1, 690, 745.19, 745.2, 745.1, 745.13, 745.09

[56] References Cited

U.S. PATENT DOCUMENTS

| | | | |
|---|---|---|---|
| 1,176,793 | 3/1916 | Tuttle | 29/21.1 |
| 3,925,875 | 12/1975 | Doke | 29/521 |
| 3,999,352 | 12/1976 | Doke | 52/690 |
| 4,235,054 | 11/1980 | Cable et al. . | |
| 4,478,018 | 10/1984 | Holand | 52/241 |
| 5,394,665 | 3/1995 | Johnson . | |
| 5,617,619 | 4/1997 | Knudson | 29/21.1 |

*Primary Examiner*—Michael Safavi
*Attorney, Agent, or Firm*—Ancel W. Lewis, Jr.

[57] ABSTRACT

A frame assembly and method of making includes forming a series of pairs of aligned, inwardly extending markings in the form of detents or holes at selected positions in opposed track side walls preferably before forming the sheet metal into the U-shaped profile, providing aligned holes at selected positions in end portions of each stud, inserting the end portion of the stud inside a track so each marking is in an adjacent hole of the aligned pairs of holes and markings, and punching through the markings into each hole to form a hollow stem that draws the end of the stud into the track and the end of the stud against the top surface of the base wall of the track, brings the centers of the holes and markings in alignment to positively fasten each stud to each track. A further step may include flaring or flattening the open end of the stem to a selected angle to form a rivet head.

5 Claims, 4 Drawing Sheets

METHOD OF MAKING A FRAMING ASSEMBLY

This application is a division, of application Ser. No. 508,260, filed Jul. 27, 1995, now U.S. Pat. No. 5,660,012.

TECHNICAL FIELD

This invention relates generally to building frames and more particularly to frame assemblies and methods of making especially with metal studs and metal tracks.

BACKGROUND ART

In the past, wooden studs have been connected by nail-type fasteners to wooden top and bottom beams to form a building frame especially for residential purposes. More recently, the studs and tracks have been provided by roll formed sheet metal members that have a generally U-shaped or C-shaped cross section. Various types of fastening techniques have been employed to fasten metal studs and tracks together. For the most part, the fastening of metal studs to metal tracks has been accomplished by self-tapping screws.

Several attempts have been made to use the material of the studs and tracks to make the fastening without the necessity of additional fasteners. Smolik U.S. Pat. No. 4,854,096 discloses the use of channels in inturned flanges in the sidewalls of the upper and lower tracks to form pockets into which the end of the stud will insert and can be twisted to snap into place. Johnson U.S. Pat. No. 5,394,665 discloses the use of inturned flanges in the sidewalls of metal studs with the ends of the studs nesting into the tracks and the protrusions in the side walls of the stud and tracks interfitting to lock the studs to the tracks.

Doke U.S. Pat. No. 3,999,352 discloses a wall section module in which the metal stud and metal tracks are connected by a rivet fastener but does not provide holes in the metal stud or indentations in the track for stud locating purposes.

Weening U.S. Pat. No. 3,082,850 teaches a structural panel produced by interlocking wall portions of rectangular tubular members whereby aligned holes of different diameters in adjacent members are caused to be deformed by a tool to produce interlocking flange portions at spaced intervals.

Meyer U.S. Pat. No. 5,157,883 and Cable et al. U.S. Pat. No. 4,235,054 also disclose metal frame members that are joined using special fastening techniques.

DISCLOSURE OF THE INVENTION

Frame assemblies and methods of making disclosed include forming a metal track having a series of pairs of opposed markings in the form of detents or smaller holes at specific selected positions along the track. Roll-formed metal studs are provided each with a pair of aligned larger holes at specific selected positions in each end portion that fit inside a pair of opposed tracks and with the larger holes over an adjacent marking of each aligned pair of markings. Each stud and track is initially assembled with each marking aligned with an adjacent larger hole followed by the use of a punch that forms a hollow stem in the track that extends through an adjacent larger hole, draws the centers of the markings and stems into alignment and presses an end of the stud against the inside bottom wall of the track to positively fasten the track to the stud. The end of the rivet stem may be flared or flattened to more firmly fasten each stud to each track.

BRIEF DESCRIPTION OF THE DRAWINGS

Details of this invention are described in connection with the accompanying drawings which like parts bear similar reference numerals in which.

DETAILED DESCRIPTION

Figure 1:
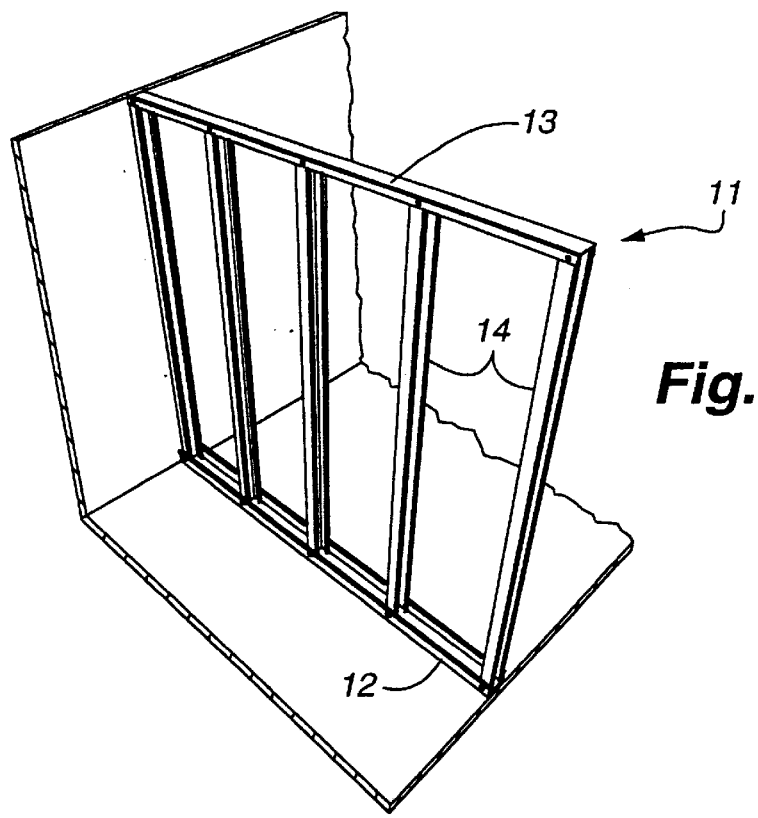
FIG. 1 is a perspective view of a frame assembly embodying features of the present invention.

Referring now to FIG. 1 there is shown a frame assembly 11 including a lower track 12, an upper track 13, and a plurality of spaced upright studs 14 nested in and fastened at opposite ends to the upper and lower tracks in accordance with the present invention.

The lower and upper tracks 12 and 13 shown are of a similar size and shape and are C-shaped or U-shaped channels and with reference to the lower track having a track base wall 16 and a pair of opposed track side walls 17 extending up from opposite side edges of the track base wall 16. The studs 14 are of a similar C-shaped or U-shaped profile each having a stud base wall 21 and a pair of spaced opposed side walls 22 but also have an inturned flange 24 at the top edges of the side walls 22 and 23, respectively. Both tracks and studs preferably are formed of sheet metal preferably using portable roll forming machinery that is readily transported to the job site.

Figure 2:
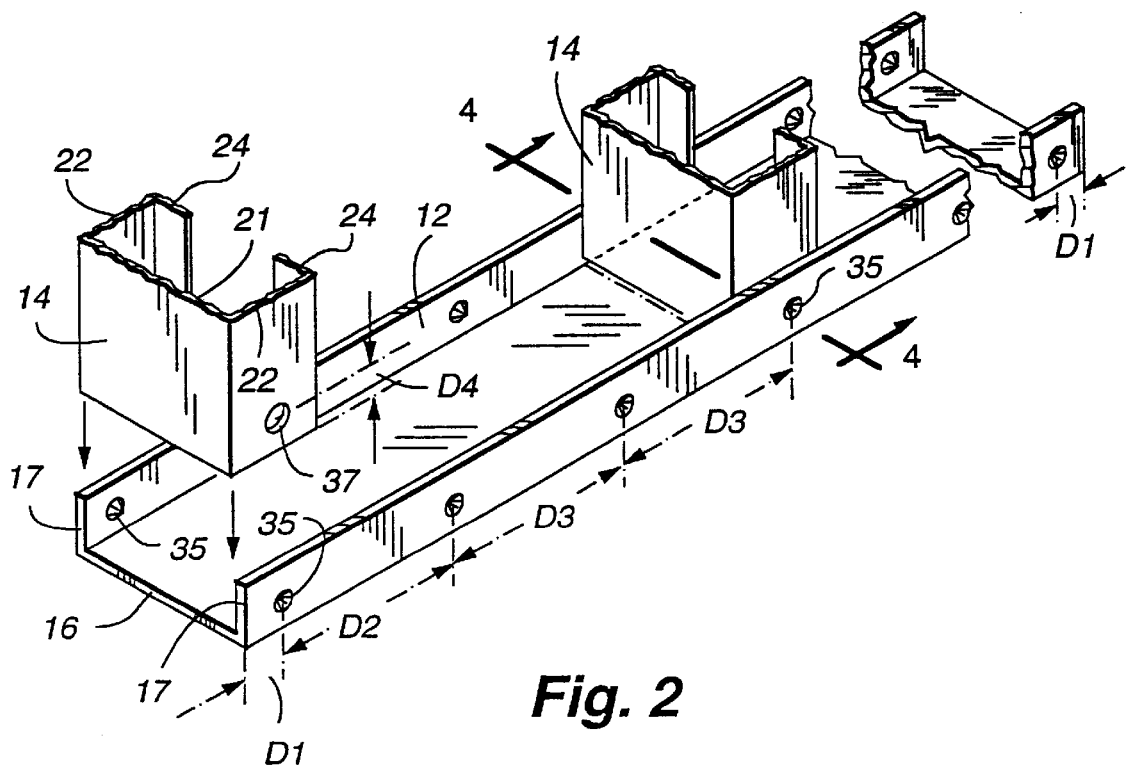
FIG. 2 is a fragmentary perspective of a lower metal track and one metal stud in a separated position and another metal stud in a first assembly position in the track.
Figure 3:
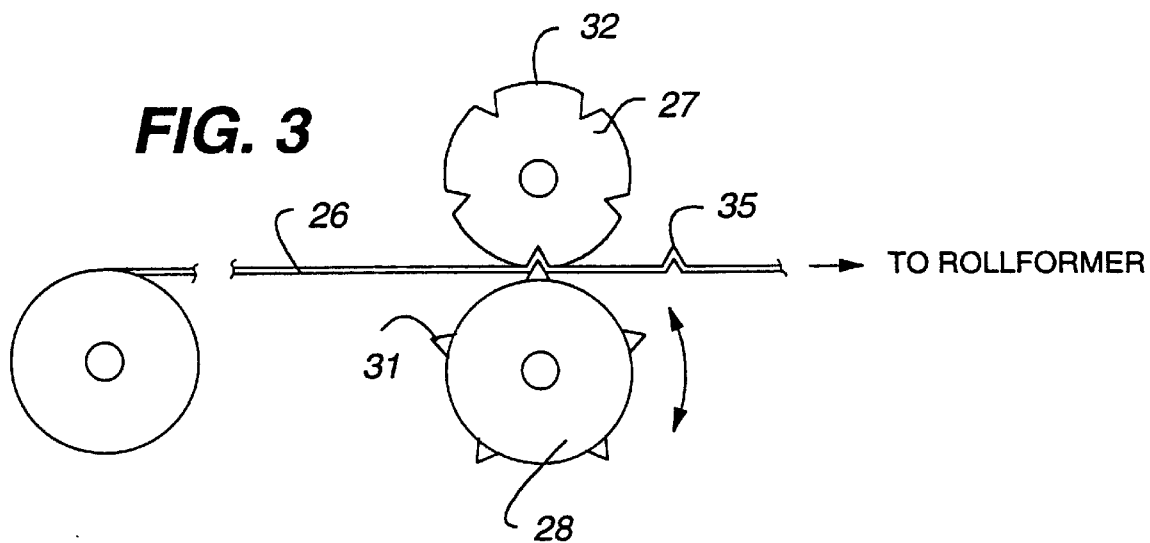
FIG. 3 is a schematic side elevation view of apparatus for forming a series of detents in a flat sheet of sheet metal roll stock.

Referring now to FIG. 3 the flat sheet metal 26 from rolled stock is shown as first passed between a pair of opposed upper and lower rollers 27 and 28. The lower roller 28 is shown as having a plurality of circumferentially spaced metal studs 31 and the upper roller a series of depressions 32 to form a series of markings in the form of detents 35 in the portions of the sheet that form the side walls. Two sets of metal studs placed side by side would be required to form the detents in both side walls as shown in FIG. 2. The sheet metal is then passed through a conventional roll forming machine to form the C-shaped profile and the inturned flanges in the tracks as shown. The detents 35 shown are a selected first distance from the end of the stud designated D1 and a selected second distance from the end detent to the second detent from the end designed D2 and then fixed distances between the third and successive detent which is designed D3. Typically, D1 is ¾ inch, D2is 3⅛ inches and D3 if 4 inches. This provides distances of 12 inches between centers of adjacent studs 14 in the track. The stud 14 has a hole 37 a selected distance inwardly from the end of the stud, which distance is designated D4. Typically D4 is ¾ inch.

Figure 4:
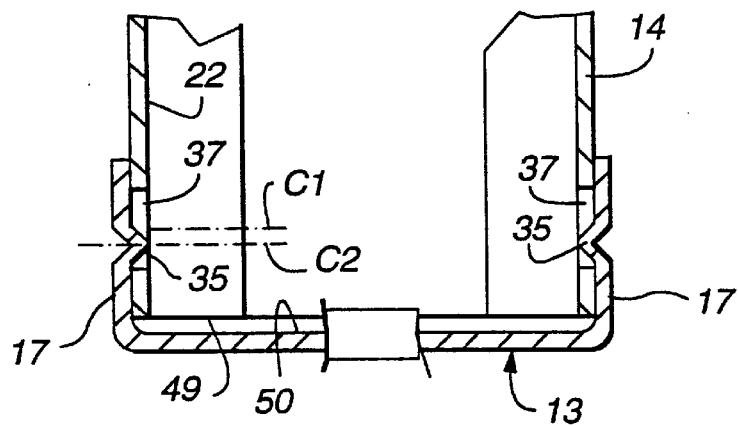
FIG. 4 is a fragmentary sectional view taken along line 4—4 of FIG. 2 showing the stud in a first assembly position in the lower track.
Figure 5:
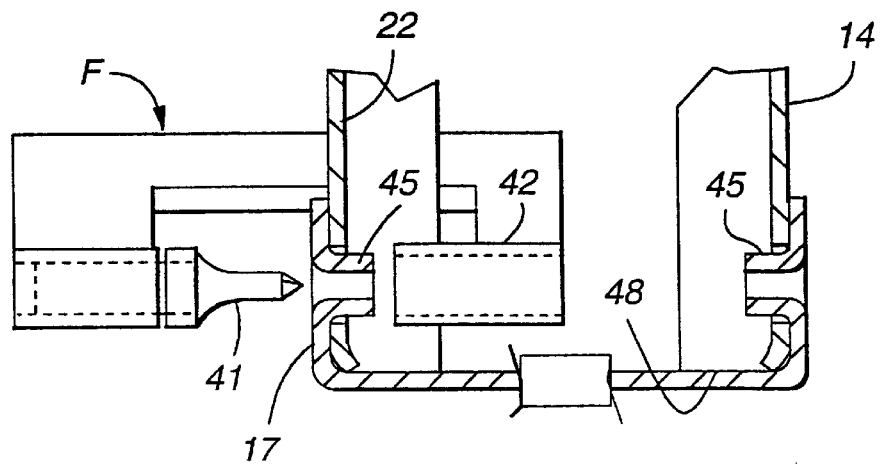
FIG. 5 is a fragmentary sectional view taken along the same lines as shown in FIG. 4 showing the stud in a second assembly position with a fastening tool added that is shown with the punch in a retracted position.
Figure 6:
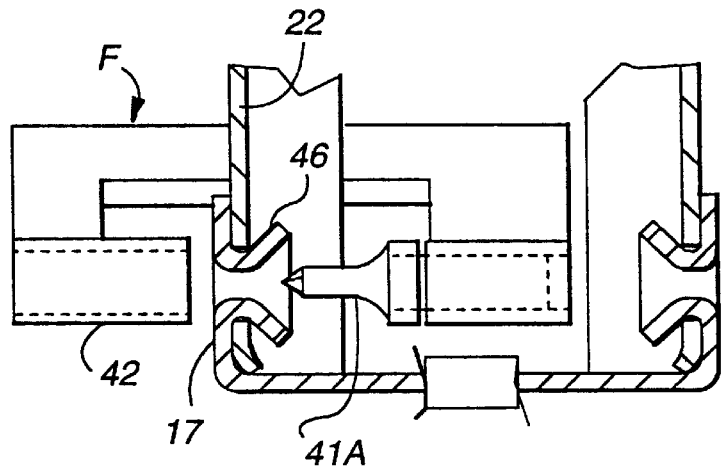
FIG. 6 is a fragmentary sectional view taken along the same lines as shown in FIG. 4 showing the hollow rivet stem in a flared condition with the fastening tool shown in a reversed position so the punch extends in an opposite direction into the open end of the stem.
Figure 7:
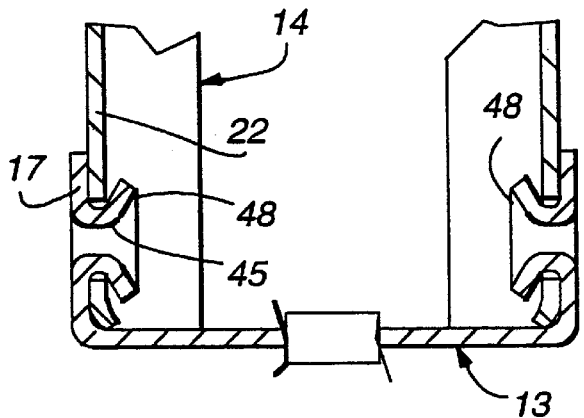
FIG. 7 is a fragmentary sectional view showing the stem in a flattened condition to form a rivet head.
Figure 8:
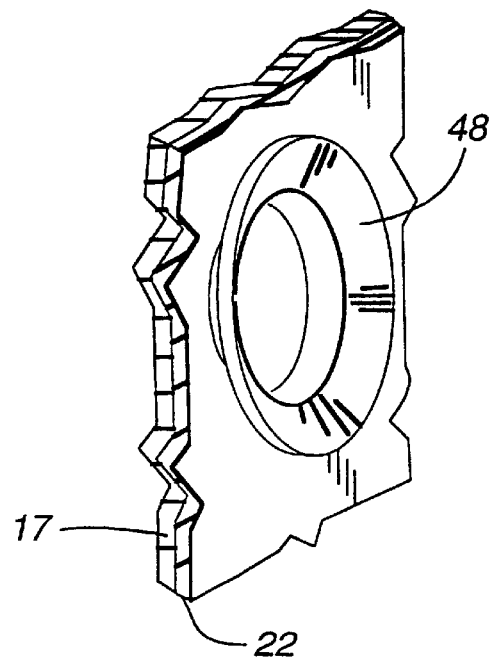
FIG. 8 is a perspective view of the flattened rivet head shown in FIG. 7.

To assemble each stud to each track the end portion of the stud 14 is inserted to nest inside the pair of opposed track side walls 17. Each detent 35 fits inside an adjacent hole 37. In a first assembly position the center C1 of the hole 37 is offset a distance above the center C2 of the detent as seen in FIG. 4. A rivet fastener tool F including a punch 41 and a hollow die 42 is provided and the punch 41 is advanced to push the material of the side wall of the track through the adjacent hole in the stud side wall to form an inwardly projecting hollow rivet stem 45. As a second step, which is optional, a modified punch 41a may be extended through the open end of the stem in a reverse direction and form a flared or flattened section or head 46 at a selected angle to the longitudinal axis of the stem such as 45 degrees as shown in FIG. 6. If the punch is extended it will flatten the open end of the stem to form a more flared or flattened section or rivet head 48 at an angle of 60 degrees as seen in FIGS. 7 and 8. The insertion of the punch 41 to form the stem 45 also moves the stud 14 down into the track so that the center C1 of the stud hole is aligned with or centered in the center C2 of the detent so as to force the end 49 of the stud firmly against the top surface 50 of the track base wall. This positively locks the end of the stud against the track base wall. The stem 45 shown is circumferentially continuous, that is, spans 360 degrees. This is also true of the head 48 shown. This stem in the hole provides positive circumferentially continuous locking forces. A suitable rivet fastener F is described in detail in my copending application Ser. No. 289,272 entitled RIVET FASTENING APPARATUS AND METHOD the disclosure of which application is incorporated herein by reference. In some instances particularly when the detent is used the flared rivet head will not be circumferentially continuous but broken into several tabs as is shown in the above mentioned copending application.

Figure 9:
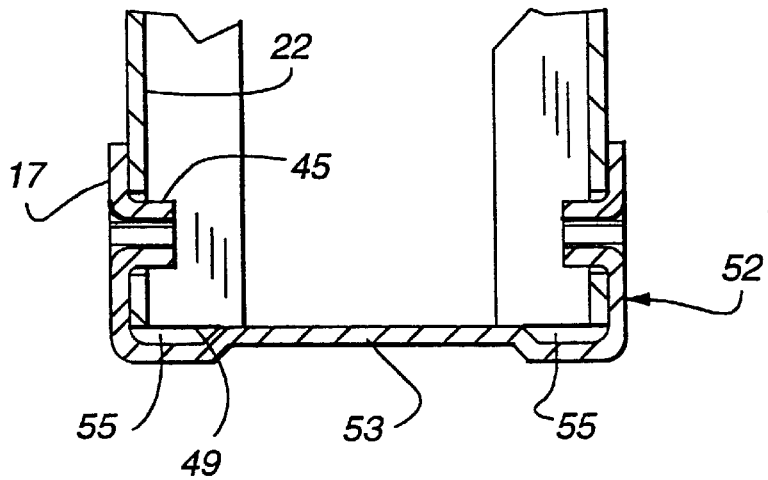
FIG. 9 is a sectional view of an alternative track profile with the stud having hollow rivet stems extending through holes in a second assembly position.

Referring now to FIG. 9 there is shown an alternative form of track 52 having a U-shaped profile with a raised base wall section 53 in the track base wall with the bottom end 49 of the stud butting against the top surface of the raised base wall section 53. The raised base wall section leaves gaps 55 in which the end of the track will fit without curling the end portion thereof.

Figure 10:
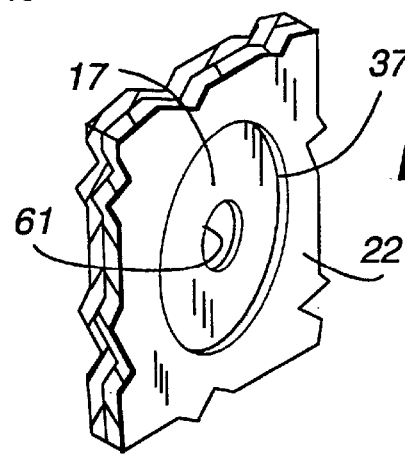
FIG. 10 is a fragmentary perspective view showing a larger hole in the stud side wall substantially centered over a smaller hole in the track side wall.
Figure 11:
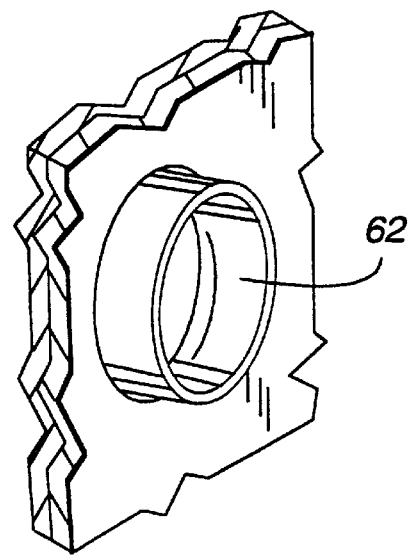
FIG. 11 is a fragmentary perspective view showing the hollow rivet stem of the track side wall in the larger hole of the stud side wall.
Figure 12:
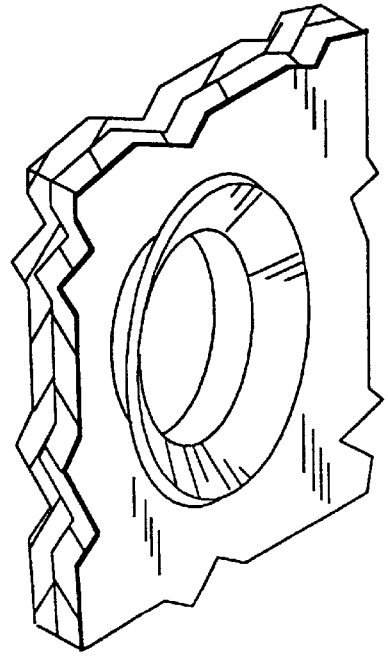
FIG. 12 is a fragmentary perspective view of the flattened rivet head formed in the stem of FIG. 11.

An alternative marking to the detents 35 is shown in FIGS. 10–12. There is provided in the track side wall 17, a smaller hole 61 that is centered in the larger hole 37 of the stud side wall 22. The punch enters the smaller hole 61 and forms the stem 62. When the punch is brought back from the opposite direction a and flattened rivet head 63 is formed much in the same way as was done with the detent as above described. The smaller hole 61 typically is on the order of half the diameter of the larger hole 37.

Although the present invention has been described with a certain degree of particularity, it is understood that the present disclosure has been made by way of example and that changes in details of structure may be made without departing from the spirit thereof.

What is claimed is:

1. A method of forming a frame assembly having at least one metal stud with a pair of opposed stud side walls fastened to a metal track having a pair of opposed track side walls comprising the steps of:

initially providing a pair of opposed markings at selected positions in the track side walls with each marking having a marking center, providing a pair of aligned holes at selected positions in an end portion of the pair of stud side walls with each hole having a hole center, inserting the end portion of the stud inside the track with each marking being substantially centered inside an adjacent hole with said hole centers being offset from said marking centers in a first assembly position for the stud, and punching through each marking into each adjacent hole to form a hollow stem to draw the stud into the track and align the hole centers with the marking centers and to force an end edge of the stud against a top surface of a back wall of the track whereby to fasten said stud to said track in a second assembly position.

2. A method as set forth in claim 1 including the further step of flaring an open end portion of said hollow stem to a selected angle to the longitudinal axis of said hollow stem to form a rivet head.

3. A method as set forth in claim 1 including the step of flaring an open end portion of said stem to an angle of about 45 degrees to the stem axis.

4. A method as set forth in claim 1 including the step of forming said markings in a flat sheet of metal prior to forming the sheet into a U-shaped profile.

5. A method of forming a frame assembly having at least one metal stud having a U-shaped profile with a stud base wall and with a pair of opposed stud side walls fastened to a metal track having a U-shaped profile with a track base wall and having a pair of opposed track side walls comprising the steps of:

initially providing a pair of opposed aligned inwardly extending markings at selected positions in the track side walls with each marking having a marking center, providing a pair of aligned holes at selected positions in an end portion of the pair of stud side walls with each hole having a hole center, inserting the end portion of the stud inside the track with each marking being substantially centered inside an adjacent hole with said hole centers being offset from the marking centers in a first assembly position for the stud, and punching through each marking into each adjacent hole to form a hollow rivet stem to draw the stud into the track and align the hole centers with the marking centers and to force an end edge of the stud against a top surface of said base wall of the track whereby to fasten said stud to said track in a second assembly position.

* * * * *